(12) United States Patent
Hsiao et al.

(10) Patent No.: US 12,508,726 B2
(45) Date of Patent: Dec. 30, 2025

(54) METHOD FOR IMPROVED DETECTION OF ANOMALOUS SUBSTRATES IN AUTOMATED MATERIAL-HANDLING SYSTEMS

(71) Applicant: HINE AUTOMATION, LLC, St. Petersburg, FL (US)

(72) Inventors: Wei-Hua Hsiao, St. Petersburg, FL (US); Raj Subramanya, Oldsmar, FL (US); Joseph Barraco, Lutz, FL (US)

(73) Assignee: HINE AUTOMATION, LLC, St. Petersburg, FL (US)

( * ) Notice: Subject to any disclaimer, the term of this patent is extended or adjusted under 35 U.S.C. 154(b) by 293 days.

(21) Appl. No.: 17/668,913

(22) Filed: Feb. 10, 2022

(65) Prior Publication Data

US 2022/0258363 A1 Aug. 18, 2022

Related U.S. Application Data

(60) Provisional application No. 63/148,970, filed on Feb. 12, 2021.

(51) Int. Cl.
*H01L 21/67* (2006.01)
*B25J 9/10* (2006.01)
(Continued)

(52) U.S. Cl.
CPC ........... *B25J 19/022* (2013.01); *B25J 9/1015* (2013.01); *B25J 9/1697* (2013.01);
(Continued)

(58) Field of Classification Search
CPC ................................ H01L 21/67265
See application file for complete search history.

(56) References Cited

U.S. PATENT DOCUMENTS 5,225,691 A * 7/1993 Powers ............ H01L 21/67265
250/559.4
5,308,993 A * 5/1994 Holman ................ G01V 8/24
414/936
5,319,216 A * 6/1994 Mokuo ................ G01V 8/20
250/559.4
(Continued)

FOREIGN PATENT DOCUMENTS

JP H0685042 A * 3/1994
JP H1148057 A * 2/1999
(Continued)

*Primary Examiner* — Gerald McClain
(74) *Attorney, Agent, or Firm* — Harvey S. Kauget, Esq.; Burr & Forman LLP

(57) ABSTRACT

A method for distinguishing between tilted and multi-stacked substrates in Automated Material-Handling Systems comprising the following steps. A substrate cassette having at least one substrate is provided. The substrate cassette is positioned within the material handling system. Each substrate has a top surface and a bottom surface. A first beam is emitted from a first emitter wherein the first beam is in optical communication with the top surface of the substrate. A second beam is emitted from a second emitter wherein the second beam is in optical communication with the bottom surface of the substrate. The first beam and the second beam are detected using at least one detector while vertically moving the substrate cassette relative to the first emitter or the second emitter.

4 Claims, 3 Drawing Sheets

(51) Int. Cl.
 *B25J 9/16* (2006.01)
 *B25J 11/00* (2006.01)
 *B25J 19/02* (2006.01)
 *H01L 21/687* (2006.01)

(52) U.S. Cl.
 CPC ..... B25J 11/0095 (2013.01); H01L 21/67265 (2013.01); H01L 21/68707 (2013.01)

(56) References Cited

U.S. PATENT DOCUMENTS

| | | | | |
|---|---|---|---|---|
| 5,466,945 | A * | 11/1995 | Brickell | H01L 21/67265 250/559.43 |
| 5,625,191 | A * | 4/1997 | Nakamura | A61B 6/102 250/363.04 |
| 6,188,323 | B1 * | 2/2001 | Rosenquist | H01L 21/67265 340/686.5 |
| 6,220,808 | B1 * | 4/2001 | Bonora | H01L 21/67775 414/217 |
| 6,281,516 | B1 * | 8/2001 | Bacchi | H01L 21/67772 414/217 |
| 6,542,839 | B1 * | 4/2003 | Lu | H01L 21/67259 250/559.38 |
| 6,815,661 | B2 * | 11/2004 | Bacchi | H01L 21/67775 250/221 |
| 6,925,356 | B2 * | 8/2005 | Schauer | H01L 21/67259 700/218 |
| 8,648,320 | B2 * | 2/2014 | Saitou | G01V 8/12 250/559.3 |
| 2008/0056855 | A1 | 3/2008 | Heo | |
| 2009/0093906 | A1 | 4/2009 | Takizawa et al. | |
| 2020/0013655 | A1 * | 1/2020 | Schober | H01L 21/6732 |
| 2021/0210368 | A1 | 7/2021 | Yokoyama et al. | |
| 2021/0213614 | A1 | 7/2021 | Okada et al. | |
| 2022/0285186 | A1 * | 9/2022 | Tseng | G01V 8/12 |

FOREIGN PATENT DOCUMENTS

| | | | |
|---|---|---|---|
| JP | 2000150624 | A * | 5/2000 |
| JP | 2011228616 | A * | 11/2011 |

\* cited by examiner

METHOD FOR IMPROVED DETECTION OF ANOMALOUS SUBSTRATES IN AUTOMATED MATERIAL-HANDLING SYSTEMS

CROSS REFERENCES TO RELATED APPLICATIONS

This application claims priority from and is related to commonly owned U.S. Provisional Patent Application Ser. No. 63/148,970 filed Feb. 12, 2021, entitled: Devices and Methods for Improved Detection of Anomalous Substrates in Automated Material-Handling Systems, this Provisional Patent application incorporated by reference herein.

FIELD OF THE INVENTION

The invention relates generally to substrate processing and, more particularly, to methods and apparatuses for loading substrates into a substrate processing system.

BACKGROUND OF THE INVENTION

In order to decrease contamination and to enhance throughput, semiconductor processing systems often utilize one or more robots to transfer semiconductor wafers, substrates and other workpieces between a number of different vacuum chambers which perform a variety of tasks. Typically, there is a loadlock chamber that has a cassette therein for holding unprocessed wafers to be unloaded by a robot and transferred to various processing chambers attached to a mainframe.

A typical cassette is supported by a platform of a cassette handler system which includes an elevator which elevates the platform and the cassette. The cassette includes a plurality of slots or wafer support locations, the elevator moves the cassette to sequentially position each of the slots to allow an end effector of a robot arm to pick or deposit a wafer in a wafer slot. The slots of the cassette may be initially loaded with as many as 25 or more unprocessed wafers or other workpieces before the cassette is loaded into the loadlock chamber.

The wafers are typically very closely spaced in many wafer cassettes. For example, the spacing between the upper surface of a wafer carried on a moving end effector of the robot arm and the lower surface of an adjacent wafer in the cassette may be as small as 0.050 inches. As a consequence, it is important that only one wafer or workpiece is in each slot of the cassette and that each wafer or workpiece is within its proper slot of the cassette.

However, typical prior methods for aligning the substrate or workpiece within the cassette have generally been relatively imprecise, often relying upon subjective visual inspections of the clearances between the various surfaces. Some tools have been developed to assist the operator in making the necessary alignments. However, many of these tools have a number of drawbacks. For example, some tools rely upon contact between the end effector and the misaligned substrate or workpiece. Such contact can be very detrimental to high precision mechanisms for moving the end effector.

As a consequence of these and other deficiencies of the prior alignment procedures and tools, alignments have often tended to be not only imprecise but also inconsistent from application to application. These problems have frequently lead to the breakage or scratching of very expensive wafers and equipment as well as the generation of damaging particulates in the systems.

Therefore, it is an object of the present invention to provide an improvement which overcomes the inadequacies of the prior art devices and which is a significant contribution to the advancement to the handling of substrates or workpieces.

Another object of the present invention is to provide an apparatus for detecting Anomalous Substrates in Automated Material-Handling Systems comprising: a substrate cassette having at least one substrate, the substrate cassette is positioned within the material handling system, the substrate having a top surface and a bottom surface; a first beam positioned within the material handling system, the first beam is in optical communication with the top surface of the substrate; a second beam positioned within the material handling system, the second beam is in optical communication with the bottom surface of the substrate; and a first detector positioned within the material handling system, the first detector is in optical communication with the first beam and the second beam.

Yet another object of the present invention is to provide an apparatus for detecting Anomalous Substrates in Automated Material-Handling Systems comprising: a substrate cassette having at least one substrate, the substrate cassette is positioned within the material handling system, the substrate having a top surface and a bottom surface; a first beam positioned within the material handling system, the first beam is in optical communication with the top surface of the substrate; a second beam positioned within the material handling system, the second beam is in optical communication with the bottom surface of the substrate; a first detector positioned within the material handling system, the first detector is in optical communication with the first beam; and a second detector positioned within the material handling system, the second detector is in optical communication with the second beam.

Still yet another object of the present invention is to provide a method for detecting Anomalous Substrates in Automated Material-Handling Systems comprising: providing a substrate cassette having at least one substrate, the substrate cassette is positioned within the material handling system, the substrate having a top surface and a bottom surface; emitting a first beam from a first emitter, the first beam being in optical communication with the top surface of the substrate; emitting a second beam from a second emitter, the second beam being in optical communication with the bottom surface of the substrate; and detecting the first beam and the second beam using a first detector.

The foregoing has outlined some of the pertinent objects of the present invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention involves arrangement of emitters, sensors, and other mechanisms within an automated material-handling system, along with software that analyzes and responds to information from the device, to automatically detect incorrect placement of semiconductor substrates, including more than one substrate in a cassette slot ("multi-stacked" substrates); and a single substrate positioned at an angle in a cassette slot ("tilted" substrates). The invention described herein provides greater accuracy in detection of misplaced substrates, and increased accuracy in differentiation between the two kinds of misplacement, compared to existing devices and methods.

Another feature of the present invention is to provide an apparatus for detecting Anomalous Substrates in Automated Material-Handling Systems comprising a substrate cassette having at least one substrate wherein the substrate cassette is positioned within the material handling system. The substrate has a top surface and a bottom surface. A first beam is positioned within the material handling system wherein the first beam is in optical communication with the top surface of the substrate. The first beam can be a laser beam. The first beam can further comprise a first optical path and a first angle between the first optical path and the substrate wherein the first optical path does not intersect more than one substrate at a time in the substrate cassette. A second beam is positioned within the material handling system wherein the second beam is in optical communication with the bottom surface of the substrate. The second beam can be a laser beam. The second beam can further comprise a second optical path and a second angle between the second optical path and the substrate wherein the second optical path does not intersect more than one substrate at a time in the substrate cassette. The first optical path can intersect the top surface of at least one substrate in the substrate cassette and the second optical path can intersect the bottom surface of at least one substrate in the substrate cassette. A first detector is positioned within the material handling system wherein the first detector is in optical communication with the first beam and the second beam.

Yet another feature of the present invention is to provide an apparatus for detecting Anomalous Substrates in Automated Material-Handling Systems comprising a substrate cassette having at least one substrate wherein the substrate cassette is positioned within the material handling system. The substrate has a top surface and a bottom surface. A first beam is positioned within the material handling system wherein the first beam is in optical communication with the top surface of the substrate. The first beam can be a laser beam. The first beam can further comprise a first optical path and a first angle between the first optical path and the substrate wherein the first optical path does not intersect more than one substrate at a time in the substrate cassette. A second beam is positioned within the material handling system wherein the second beam is in optical communication with the bottom surface of the substrate. The second beam can be a laser beam. The second beam can further comprise a second optical path and a second angle between the second optical path and the substrate wherein the second optical path does not intersect more than one substrate at a time in the substrate cassette. The first optical path can intersect the top surface of at least one substrate in the substrate cassette and the second optical path can intersect the bottom surface of at least one substrate in the substrate cassette. A first detector is positioned within the material handling system wherein the first detector is in optical communication with the first beam. A second detector is positioned within the material handling system wherein the second detector is in optical communication with the second beam.

Still yet another feature of the present invention is to provide a method for detecting Anomalous Substrates in Automated Material-Handling Systems comprising the following steps. A substrate cassette having at least one substrate is provided. The substrate cassette is positioned within the material handling system. Each substrate has a top surface and a bottom surface. A first beam is emitted from a first emitter wherein the first beam is in optical communication with the top surface of the substrate. The first beam can further comprise a first optical path and a first angle between the first optical path and the substrate wherein the first optical path does not intersect more than one substrate at a time in the substrate cassette. A second beam is emitted from a second emitter wherein the second beam is in optical communication with the bottom surface of the substrate. The second beam can further comprise a second optical path and a second angle between the second optical path and the substrate wherein the second optical path does not intersect more than one substrate at a time in the substrate cassette. The second optical path can intersect the bottom surface of at least one substrate in the substrate cassette. The first beam and the second beam are detected using a first detector. The method can further comprise a second detector can be positioned within the material handling system, the second detector can be in optical communication with the first beam or the second beam wherein the first detector can be in optical communication with the first beam or the second beam. The method can further comprise comparing a first signal detected by the first detector to a second signal detected by the second detector. The method can further comprise moving the first emitter or the second emitter relative to the substrate cassette. The method can further comprise moving the substrate cassette relative to the first emitter or the second emitter.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Similar reference characters refer to similar parts throughout the several views of the drawings.

DETAILED DESCRIPTION OF THE INVENTION

Equipment for manufacturing of complex electronics devices on disks of semiconductor materials ("substrates") utilizes automated mechanisms to move materials within the equipment. These mechanisms and their methods include material cassettes and cassette elevators.

A material cassette is a standardized fixture that provides slots that are arranged vertically to hold semiconductor substrates so they are accessible to the automated mechanisms of material-handling systems. Cassette slots are typically arranged with equal vertical spacing ("pitch") between slots. Each slot is intended to contain no more than one substrate as shown in FIG. 1.

Figure 1:
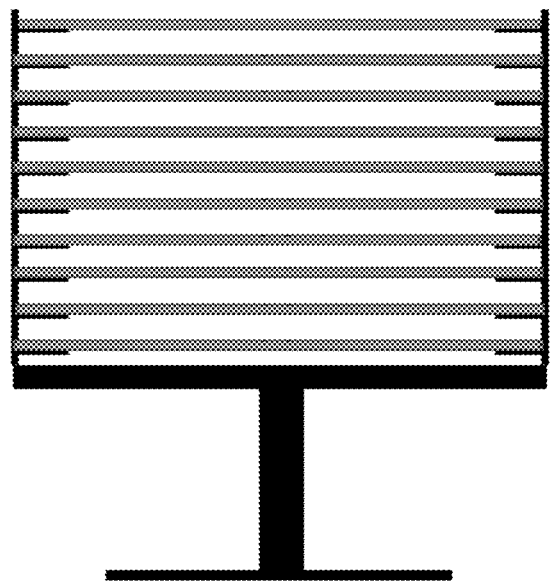
FIG. 1 is a front view of a substrate cassette on an elevator.
Figure 2:
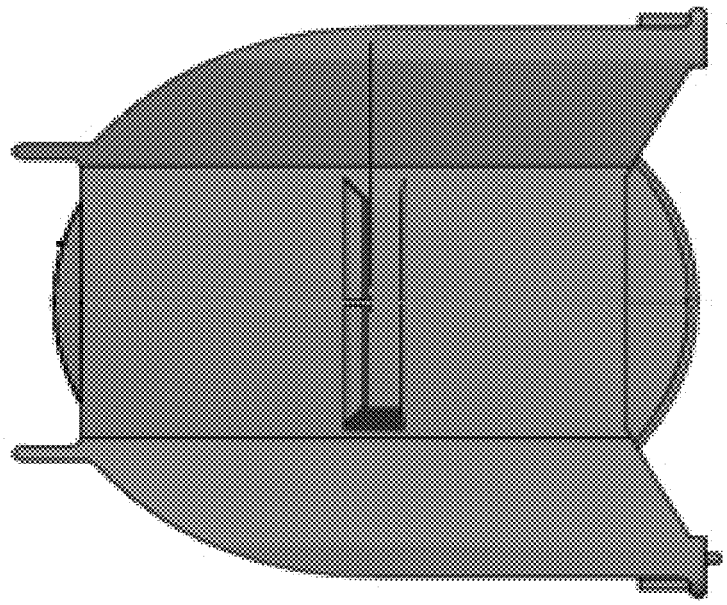
FIG. 2 is a top view of a substrate cassette.

A cassette elevator is an electrical-mechanical device that moves a cassette vertically to position substrates to be accessed by mechanisms within a material-handling system, see FIG. 1.

Figure 3:
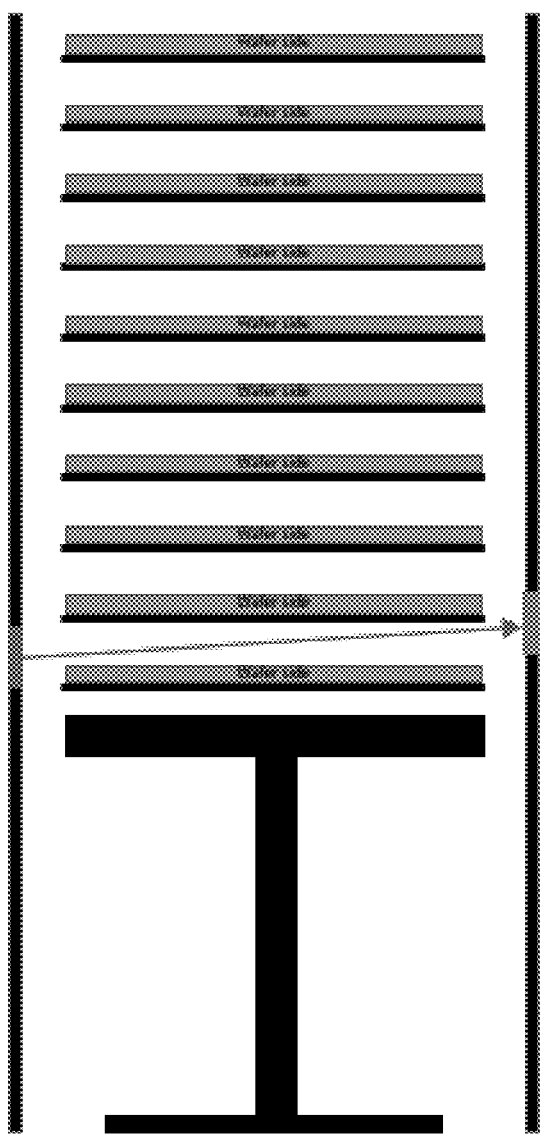
FIG. 3 is a side view of a laser light beam in cassette slot at angle from back to front.

A process that utilizes devices and software within the system to create an accurate representation of substrates (presence and location) within a cassette is known as Substrate Mapping. The typical prior art cassette mapping process utilizes a single emitter (e.g., laser beam) and a receiver/detector (e.g., light sensor). The emitter emits a beam of light that traverses a substrate slot from back to front. The emitter is positioned so the light beam is at an angle to the horizontal plane of the slot. The emitter and sensor are in fixed positions, see FIG. 3.

Figure 4:
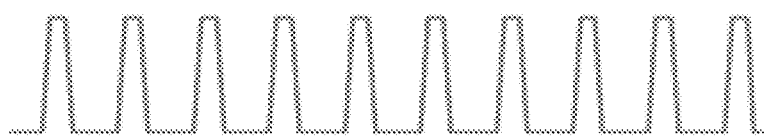
FIG. 4 is a graph of a light sensor electrical signal received by a detector.

A mechanism ("elevator") moves the cassette vertically at a known rate, so that each cassette slot passes through the light beam. The light beam is received at the sensor when no substrate is present in a slot. When a substrate is present in a slot, the substrate surface blocks the light beam from reaching the sensor. The sensor produces an electrical signal of a first value when the light beam is blocked and a second value when the light beam is not blocked as shown in FIG. 4. The system's software interprets the electrical signal to produce a "map" of the substrates within the cassette.

In some cases more than one substrate may be located in a single cassette slot (e.g. double-stacked). In the automated material-handling systems described herein, detection of multi-stacked substrates is critical. Failure to detect multi-stacked substrates can result in damage to the equipment and to valuable semiconductor substrates.

Figure 5:
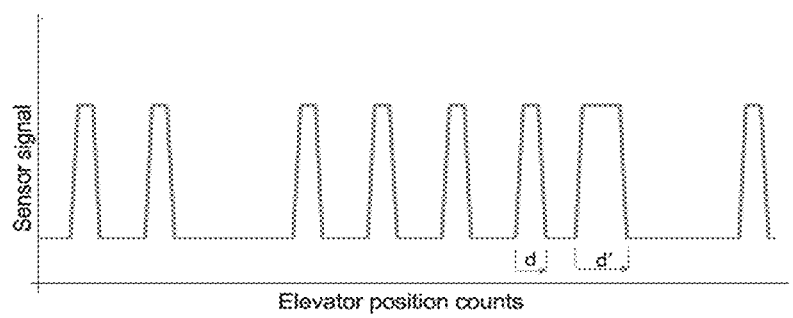
FIG. 5 is a graph of a light sensor electrical signal resulting from a single substrate and multi-stacked substrates.

The typical prior art cassette mapping process produces an electrical signal as shown in FIG. 5 in which the duration, or graphed distance, from the first value to the second value is shorter for a single substrate (d) than for double-stacked substrates (d').

Another anomalous substrate condition is a "tilted" substrate within a slot. This occurs if a substrate is pushed as far as possible to the back of the slot, which causes the back of the substrate to be higher than the front. The same effect can also be caused by an abnormality in the cassette slot itself. The tilted substrate condition does not necessarily impose a risk of damage. However, with current mapping devices and methods, tilted substrates (OK to proceed) can be incorrectly detected as multi-stacked substrates (not OK to proceed).

Varying the placement of the emitter and the sensor can result in marginal improvement in the ability of the system to detect tilted substrates. Placement of the laser and the sensor so that the light beam rotates across the substrate during mapping can minimize the effect of tilted substrates being mis-detected as multi-stacked substrates. However, a single laser and single sensor configuration cannot be used to distinguish between tilted and multi-stacked substrates. The optical profile—and therefore the resulting electrical signal from the sensor—is nearly identical for a tilted substrate and multi-stacked substrates.

In one embodiment of the present invention, there are two emitters (e.g., lasers) and at least one detector (e.g., light sensors), and associated software that analyzes the signals from the sensor to allow the material-handling system to distinguish between tilted and multi-stacked substrates.

Figure 6:
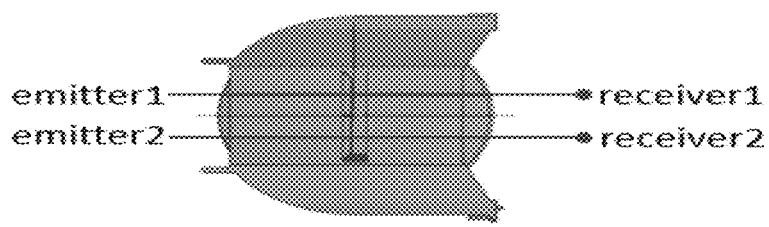
FIG. 6 is a perspective view of one embodiment of the present invention showing dual emitters and receivers.

In another embodiment of the present invention, there are two emitters (e.g., lasers) and two detectors (e.g., light sensors), and associated software that analyzes the signals from the sensors to allow the material-handling system to distinguish between tilted and multi-stacked substrates as shown in FIG. 6.

The emitters and light sensors are positioned so that the light beam from an emitter traverses the substrates in the cassette at opposing angles. A first optical path between a first light beam and a first detector is out of plane with the substrate (e.g., the emitter is positioned above the substrate and the detector is positioned below the substrate). The angle between the first optical path and the substrate must be relatively small—typically less than 5 degrees. The ideal angle is limited by the pitch of the cassette; for a SEMI standard cassette with a slot pitch of 0.1875 inches, for example, the ideal angle was found to be 1 degree. The angle between the first optical path and the substrate must be small enough such that the first optical path does not intersect more than one substrate at a time in the cassette.

A second optical path of a second light beam and a second detector is also out of plane with the substrate. The angle between the second optical path and the substrate must be relatively small—typically less than 5 degrees. The ideal angle is limited by the pitch of the cassette; for a SEMI standard cassette with a slot pitch of 0.1875 in., for example, the ideal angle was found to be 1 degree. The angle between the second optical path and the substrate must be small enough such that the second optical path does not intersect more than one substrate at a time in the cassette.

The second optical path intersects the substrate from the opposite side of the substrate that the first optical path intersects the substrate (e.g., if the first emitter is positioned above the substrate then the first optical path intersects the substrate from above, and if the second emitter is positioned below the substrate then the second optical path intersects the substrate from below). In other words, relative to the plane of the substrate—if the angle between the substrate and the first optical path is positive, then the angle between the substrate and the second optical path will be negative. When a substrate is present in a cassette slot, both light sensors produce a similar signal (if the angles between the substrate and optical paths are equal and opposite sign, then the signals will be identical). That is, the light beam from each emitter is blocked for a similar number of elevator motor counts, and the sensors produce the similar electrical signal profile.

Figure 7:
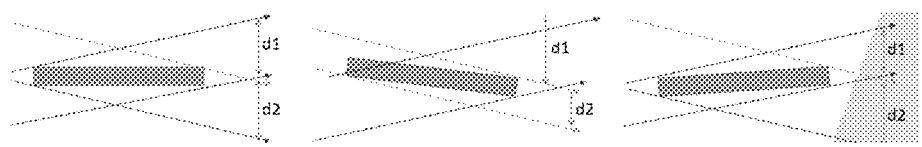
FIG. 7 is a graphical representation of the signal differences from a single flat substrate and from a tilted single substrate.

If a substrate is tilted in a cassette slot, the light beam from one emitter is blocked from its sensor for a significantly longer period (during a greater number of elevator motor counts) than the light beam from the second emitter, see FIG. 7.

When two substrates are present in a single cassette slot, the light beam from each emitter is blocked for a similar period. The resulting electrical signal profile produced by the sensors; however, differs significantly from the signal profile of a single substrate in a cassette slot.

Two emitters and receivers (e.g., lasers and light sensors), positioned so that the light beams travel across the cassette slots on planes that are angled relative to each other, provide the ability to determine relative thickness (rt) of the material in the cassette slot, without regard to whether the substrate is tilted.

The ability of the device to accurately detect tilted substrates within a cassette slot increases the ability of the system to distinguish multiple substrates in a slot from a single substrate in a slot. This system allows the software to determine a relative thickness value that is significantly larger than that of a single substrate, whether flat or tilted within the cassette slot.

Data from testing 100 mm and 200 mm Si wafers proves that the improvement in substrate detection is significant. Testing was performed by mapping cassettes in which a slot contained the following material configurations:
1. Single substrate
2. Single substrate tilted by 0.8 mm higher at the front of the cassette slot
3. Single substrate tilted by 0.8 mm higher at the back of the cassette slot
4. Stack of two substrates
5. Stack of two substrates tilted by 0.8 mm higher at the front of the cassette slot
6. Stack of two substrates tilted by 0.8 mm higher at the back of the cassette slot The following are the numeric results from the substrate detection testing using the improved device and methods:

TABLE 1

Signal data from 100 mm Si substrate.
Supporting Data
100 mm diameter standard Si wafer
Single/Tilt: Maximum rT = 162
Multi-stack: Minimum rT = 180

| Single wafer mapping | | | | Single cassette tilt front | | | | Single cassette tilt back | | | |
| --- | --- | --- | --- | --- | --- | --- | --- | --- | --- | --- | --- |
| slot | d1 | d2 | Sum (rT) | slot | d1 | d2 | Sum (rT) | slot | d1 | d2 | Sum (rT) |
| 21 | 55 | 100 | 156 | 21 | 21 | 129 | 150 | 21 | 93 | 66 | 159 |
| 22 | 61 | 96 | 157 | 22 | 26 | 121 | 147 | 22 | 97 | 60 | 157 |
| 23 | 53 | 102 | 155 | 23 | 28 | 133 | 161 | 23 | 84 | 77 | 161 |
| 24 | 50 | 101 | 151 | 24 | 25 | 133 | 158 | 24 | 84 | 77 | 161 |
| 25 | 59 | 98 | 157 | 25 | 22 | 129 | 151 | 25 | 85 | 76 | 162 |

| Stack wafer mapping | | | | Stack cassette tilt front | | | | Stack cassette tilt back | | | |
| --- | --- | --- | --- | --- | --- | --- | --- | --- | --- | --- | --- |
| slot | d1 | d2 | Sum (rT) | slot | d1 | d2 | Sum (rT) | slot | d1 | d2 | Sum (rT) |
| 21 | 94 | 98 | 192 | 21 | 59 | 123 | 182 | 21 | 129 | 57 | 186 |
| 22 | 82 | 108 | 190 | 22 | 48 | 133 | 181 | 22 | 122 | 71 | 193 |
| 23 | 84 | 103 | 187 | 23 | 51 | 129 | 180 | 23 | 122 | 68 | 190 |
| 24 | 90 | 102 | 192 | 24 | 57 | 127 | 184 | 24 | 127 | 60 | 187 |
| 25 | 78 | 108 | 186 | 25 | 41 | 139 | 180 | 25 | 113 | 78 | 191 |

TABLE 2

Signal data from 200 mm Si substrate.
200 mm diameter Si wafer
Single/Tilt: Maximum rT = 301
Multi-stack: Minimum rT = 350

| Single wafer mapping | | | | Single cassette tilt front | | | | Single cassette tilt back | | | |
| --- | --- | --- | --- | --- | --- | --- | --- | --- | --- | --- | --- |
| slot | d1 | d2 | Sum (rT) | slot | d1 | d2 | Sum (rT) | slot | d1 | d2 | Sum (rT) |
| 21 | 159 | 141 | 300 | 21 | 109 | 182 | 291 | 21 | 170 | 129 | 299 |
| 22 | 145 | 153 | 298 | 22 | 100 | 190 | 290 | 22 | 167 | 134 | 301 |
| 23 | 144 | 151 | 295 | 23 | 102 | 188 | 290 | 23 | 166 | 133 | 299 |
| 24 | 153 | 144 | 297 | 24 | 111 | 180 | 291 | 24 | 178 | 120 | 298 |
| 25 | 155 | 143 | 298 | 25 | 115 | 176 | 291 | 25 | 182 | 118 | 300 |

| Stack wafer mapping | | | | Stack cassette tilt front | | | | Stack cassette tilt back | | | |
| --- | --- | --- | --- | --- | --- | --- | --- | --- | --- | --- | --- |
| slot | d1 | d2 | Sum (rT) | slot | d1 | d2 | Sum (rT) | slot | d1 | d2 | Sum (rT) |
| 21 | 186 | 172 | 358 | 21 | 143 | 209 | 352 | 21 | 213 | 145 | 358 |
| 22 | 172 | 184 | 356 | 22 | 131 | 221 | 352 | 22 | 214 | 145 | 359 |
| 23 | 178 | 178 | 356 | 23 | 135 | 215 | 350 | 23 | 209 | 147 | 356 |
| 24 | 182 | 178 | 360 | 24 | 139 | 211 | 350 | 24 | 217 | 141 | 358 |
| 25 | 185 | 176 | 361 | 25 | 138 | 213 | 351 | 25 | 220 | 137 | 357 |

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

We claim:

1. A method for distinguishing between tilted and multi-stacked substrates in Automated Material-Handling Systems comprising:

providing a SEMI standard substrate cassette carrier having at least one substrate in a cassette slot, the SEMI standard substrate cassette carrier is positioned within the material handling system, the substrate having a top surface and a bottom surface;

moving the SEMI standard substrate cassette carrier with the substrate vertically via an elevator at a known rate;

producing a signal profile from a first optical path between a first light beam and a first detector and a second optical path of a second light beam and a second detector while vertically moving the SEMI standard substrate cassette with the substrate at the known rate, wherein the first light beam is positioned above the substrate and the first detector is positioned below the substrate and wherein the second light beam is positioned below the substrate and the second detector is positioned above the substrate, wherein the first detector and the second detector are positioned at opposing angles across the substrate;

determining the presence of the substrate or substrates within the cassette slot or cassette slots of the SEMI standard substrate cassette carrier using said produced signal profile; and determining the relative thickness of the substrate or substrates within the cassette slot or cassette slots of the SEMI standard substrate cassette carrier using the produced signal profile.

2. The method according to claim 1 wherein a first angle between the first optical path and the substrate is less than five degrees, wherein the first optical path does not intersect more than one substrate at a time in the SEMI standard substrate cassette.

3. The method according to claim 2 wherein a second angle between the second optical path is less than five degrees, wherein the second optical path does not intersect more than one substrate at a time in the SEMI standard substrate cassette.

4. The method according to claim 1 further comprises determining between tilted and multi-stacked substrate or substrates within the cassette slot or cassette slots of the SEMI standard substrate cassette carrier using the produced signal profile.

* * * * *